No. 720,525. PATENTED FEB. 10, 1903.
A. KEPLER.
BOG EVENER.
APPLICATION FILED JUNE 2, 1902.
NO MODEL. 2 SHEETS—SHEET 1.

Witnesses
J. P. Britt
Harry Ellis Chandler

Inventor
By A. Kepler,
Chandler & Chandler
Attorneys

THE NORRIS PETERS CO., PHOTO-LITHO., WASHINGTON, D. C.

No. 720,525. PATENTED FEB. 10, 1903.
A. KEPLER.
BOG EVENER.
APPLICATION FILED JUNE 2, 1902.
NO MODEL. 2 SHEETS—SHEET 2.

Witnesses
J. P. Britt
Harry Ellis Chandlee

Inventor
A. Kepler
By Chandlee & Chandlee
Attorneys

UNITED STATES PATENT OFFICE.

ANDREW KEPLER, OF DUNNING, NEBRASKA, ASSIGNOR OF ONE-HALF TO CURTIS S. MOONEY, OF DUNNING, NEBRASKA.

BOG-EVENER.

SPECIFICATION forming part of Letters Patent No. 720,525, dated February 10, 1903.

Application filed June 2, 1902. Serial No. 109,876. (No model.)

*To all whom it may concern:*

Be it known that I, ANDREW KEPLER, a citizen of the United States, residing at Dunning, in the county of Blaine, State of Nebraska, have invented certain new and useful Improvements in Bog-Eveners; and I do hereby declare the following to be a full, clear, and exact description of the invention, such as will enable others skilled in the art to which it appertains to make and use the same.

This invention relates to bog-eveners or land-leveling machines; and it has for its object to provide a machine or implement which may be drawn over uneven or boggy land and will act to cut off the knobs, fill in the hollows, and cut down the scrubby growths, a further object of the invention being to provide an implement which will have no effect whatever upon even ground, and thus will not injure the level ground while treating the unlevel ground.

Other objects and advantages of the invention will be understood from the following description.

Figure 1:
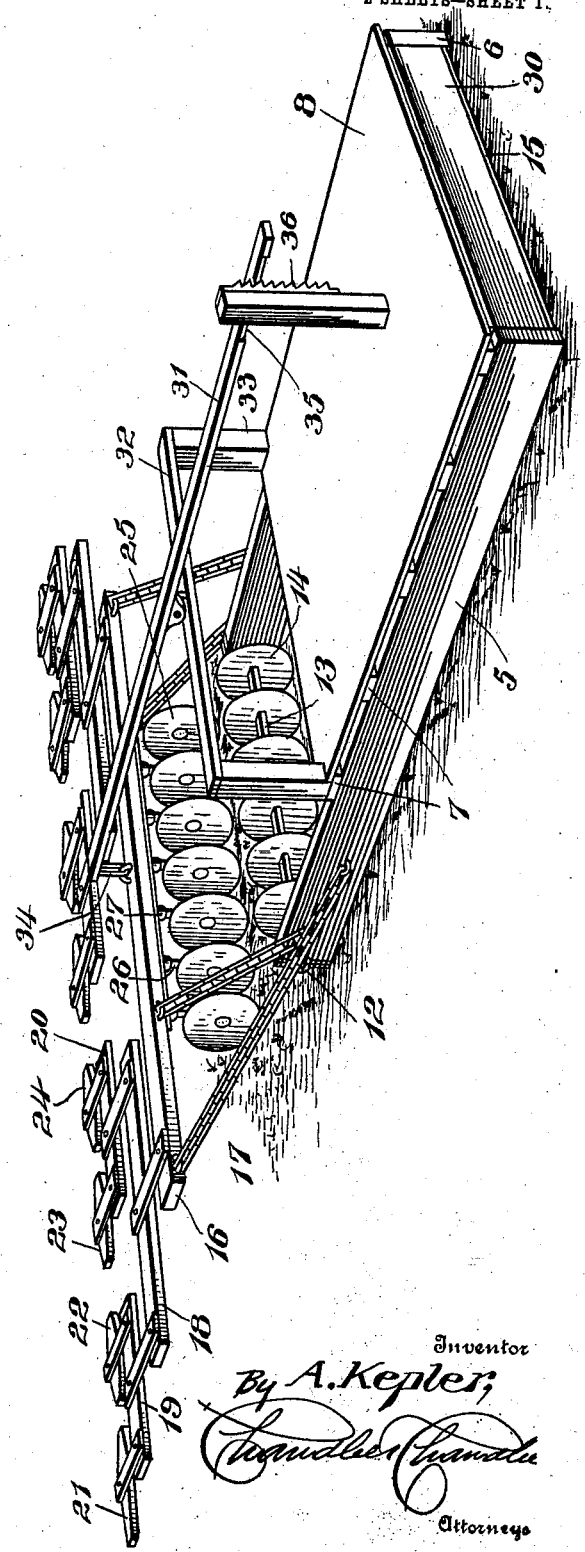
Figure 2:
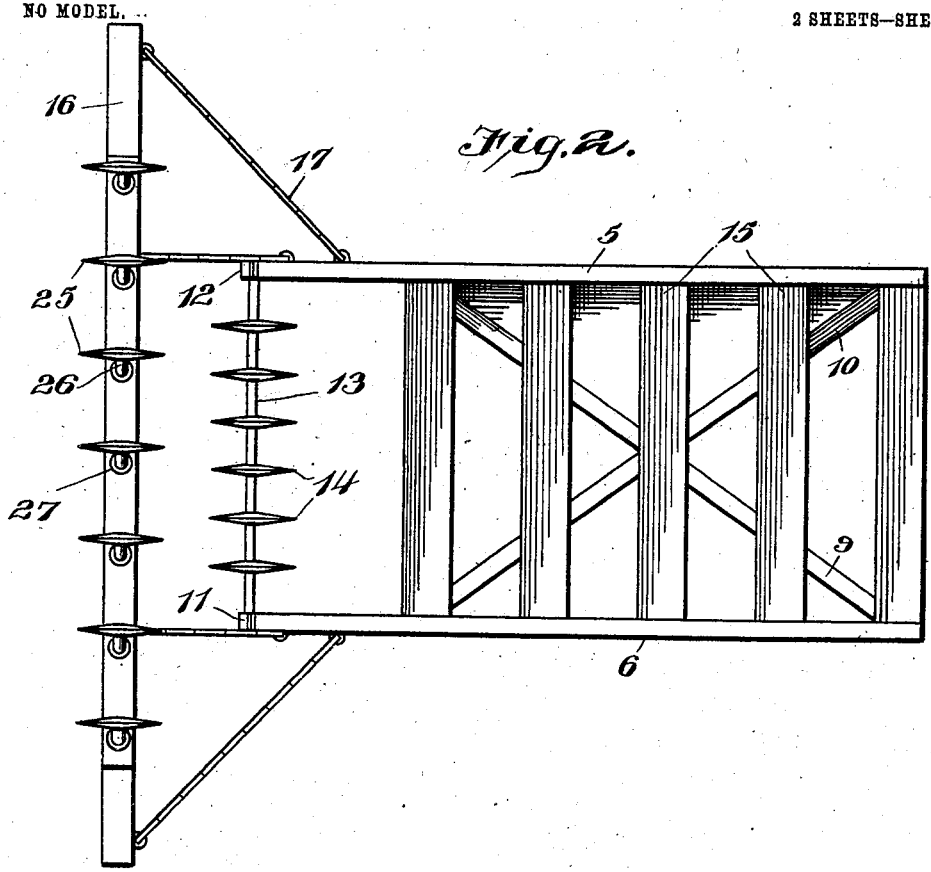
Figure 3:
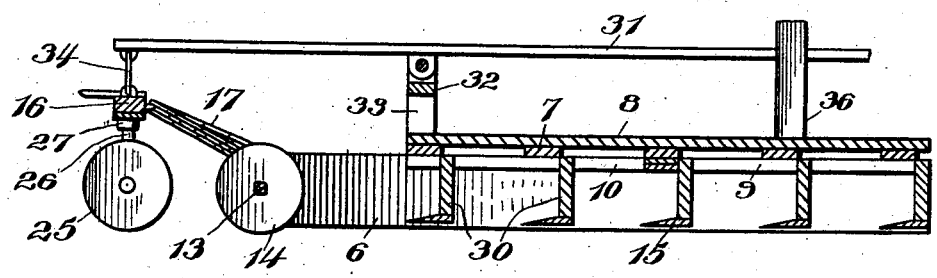

In the drawings forming a portion of this specification, and in which like numerals of reference indicate similar parts in the several views, Figure 1 is a perspective view of the implement. Fig. 2 is a bottom plan view of the main or body portion of the implement. Fig. 3 is a vertical section taken longitudinally through the body of the implement.

Referring now to the drawings, the present implement comprises a main body portion which consists of the spaced sills 5 and 6, upon the upper edges of which are secured the cross-pieces 7, to the upper face of which is attached the platform 8 of the implement, the sills being connected by diagonal braces 9 and 10, which are arranged directly below the platform. At the front ends of the sills 5 and 6 are bearings 11 and 12, in which is journaled a transverse shaft 13, and on the central squared portion of the shaft are mounted colter-disks 14, which are spaced equidistant between the sills, so that as the implement is drawn along in the manner hereinafter described these colters will engage and chop the scrubby growths.

Secured to the sills 5 and 6 and extending transversely thereof at right angles to the sills are knives 15, which in the present instance are five in number. Each of these knives in practice is about eight inches wide, so that they are, in effect, plates having sharpened forward edges, and these sharpened forward edges lie slightly above the lower faces or edges of the sills 5 and 6. The knives or sharpened plates are all parallel and are spaced apart for the purpose hereinafter explained.

In practice the implement is drawn over the rough or uneven ground, at which time the lower edges of the sills 5 and 6 act as runners. The implement is drawn by a team of horses or other draft-animals, and the hitching-gear includes a doubletree 16, which is connected by a chain 17 with the end portions of the sills 5 and 6, and with each end of the doubletree is connected a four-horse evener, including the trees 18, 19, 20, 21, 22, 23, and 24, so that eight horses may be hitched to the implement, it being understood, however, that a greater or lesser number of draft-animals may be hitched to the implement, as may be preferred.

Secured to the doubletree 16 are the disk colters 25, having their stems 26 pivotally mounted in hangers 27, so that said colters may best follow the undulations of the ground. In the use of the implement the colters first engage the growths that might interfere with the operation of the knives and chop them, and as the knives are drawn over the ground they engage those knobs that enter between the knives or rise between the sills and cut the tops off the knobs, the dirt that is cut off being dragged over the ground until hollows are encountered, when the dirt falls into the hollow and the knives pass over it, the dirt being prevented from passing rearwardly over the plates or knives by vertical partitions 30, which are secured transversely between the sills of the evener. In this way the implement acts not only to cut off the knobs, but also to fill in the slight depressions or hollows, and each time the ground is gone over the ground is reduced to a condition more nearly level.

In practice it has been found that on extremely rough ground it is only necessary to go over the ground twice to place the ground in such condition as to permit of the operation of a mower on a subsequent crop of grass or grain.

At times it is desired to raise the doubletree, with the colters, into inactive position, and for this purpose a lever 31 is pivoted to the cross-piece 32, mounted upon the posts 33 near to the front end of the evener. The lever projects at its forward end beyond the evener and is connected by links 34 with the doubletree 16. The lever extends rearwardly from the platform and has a knife-edge 35 disposed for engagement with the notched post 36 on the platform to hold the lever at different points of its adjustment.

It will be understood that in practice modifications of the specific construction shown may be made and that any suitable materials and proportions may be used for the various parts without departing from the spirit of the invention.

What is claimed is—

1. An implement of the class described comprising spaced sills and connecting cross-beams, and a knife secured against the under faces of the cross-beams, transversely of the sills and projecting forwardly and downwardly from the cross-beams, as and for the purpose described.

2. An implement of the class described comprising spaced sills, spaced knives secured transversely of the sills and disposed with their cutting edges in the same direction adjacent to the plane of the lower faces of the sills, a doubletree attached to the forward ends of the sills and colters carried by the doubletree.

3. An implement of the class described comprising spaced sills, spaced knives secured transversely of the sills and disposed with their cutting edges in the same direction adjacent to the plane of the lower faces of the sills, a plurality of laterally-spaced colters secured between the sills in advance of the knives, a doubletree attached to the forward ends of the sills and additional colters carried by the doubletree.

4. An implement of the class described comprising spaced sills, spaced knives secured transversely of the sills and disposed with their cutting edges in the same direction adjacent to the plane of the lower faces of the sills, a doubletree attached to the forward ends of the sills, colters carried by the doubletree and means for raising and holding the doubletree with the colters inactive.

5. An implement of the class described comprising spaced sills, spaced knives secured transversely of the sills and disposed with their cutting edges in the same direction adjacent to the plane of the lower faces of the sills, a plurality of laterally-spaced colters secured between the sills in advance of the knives, a doubletree attached to the forward ends of the sills, additional colters carried by the doubletree and means for raising and holding the doubletree with the colters inactive.

In testimony whereof I affix my signature in presence of two witnesses.

ANDREW KEPLER.

Witnesses:
W. BOYER,
F. H. FEILD.